Oct. 21, 1969
J. G. FARROW
3,473,194
PLASTIC PIPE SIZING
Filed Jan. 23, 1967
2 Sheets-Sheet 1
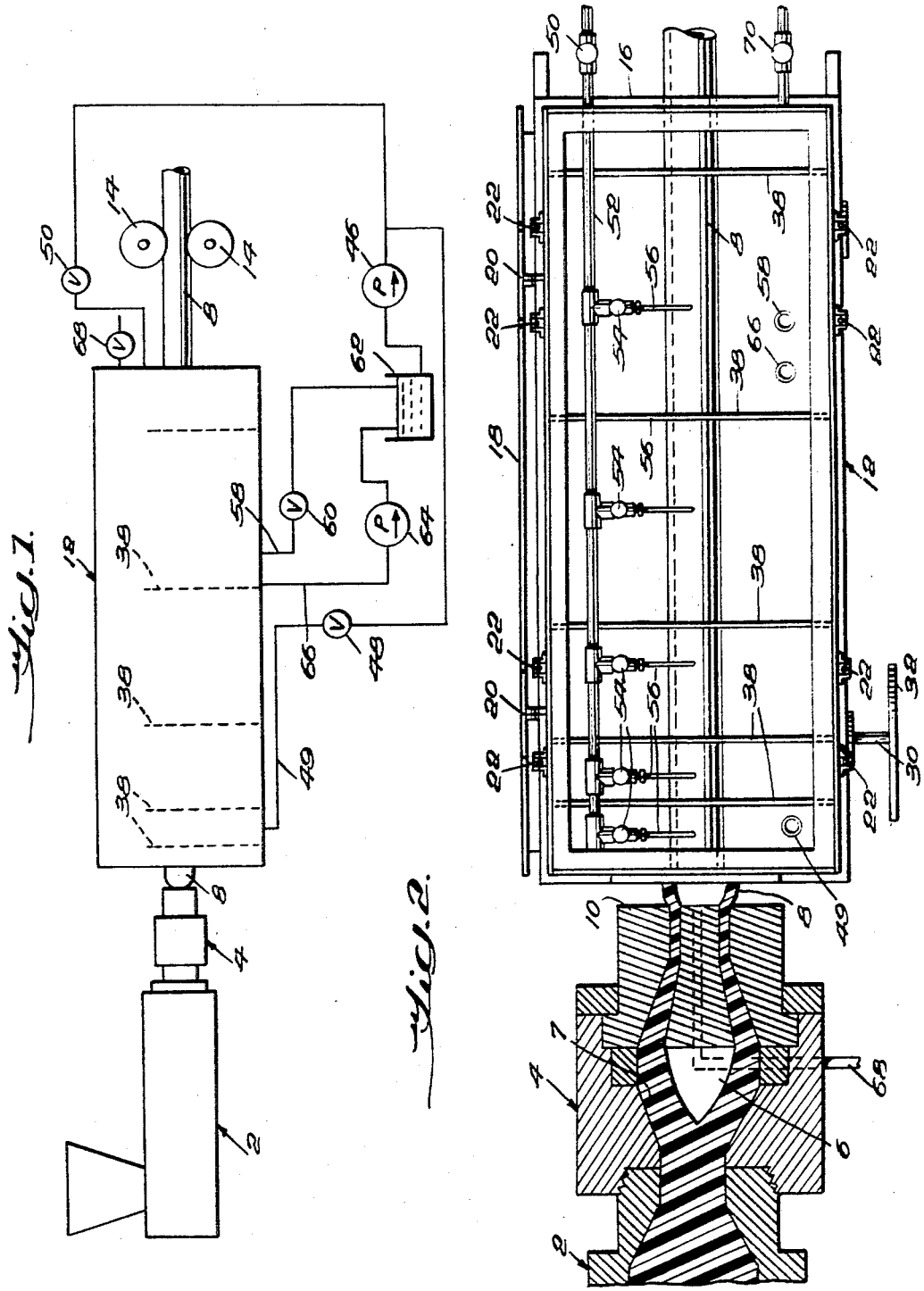

Oct. 21, 1969  J. G. FARROW  3,473,194
PLASTIC PIPE SIZING
Filed Jan. 23, 1967  2 Sheets-Sheet 2
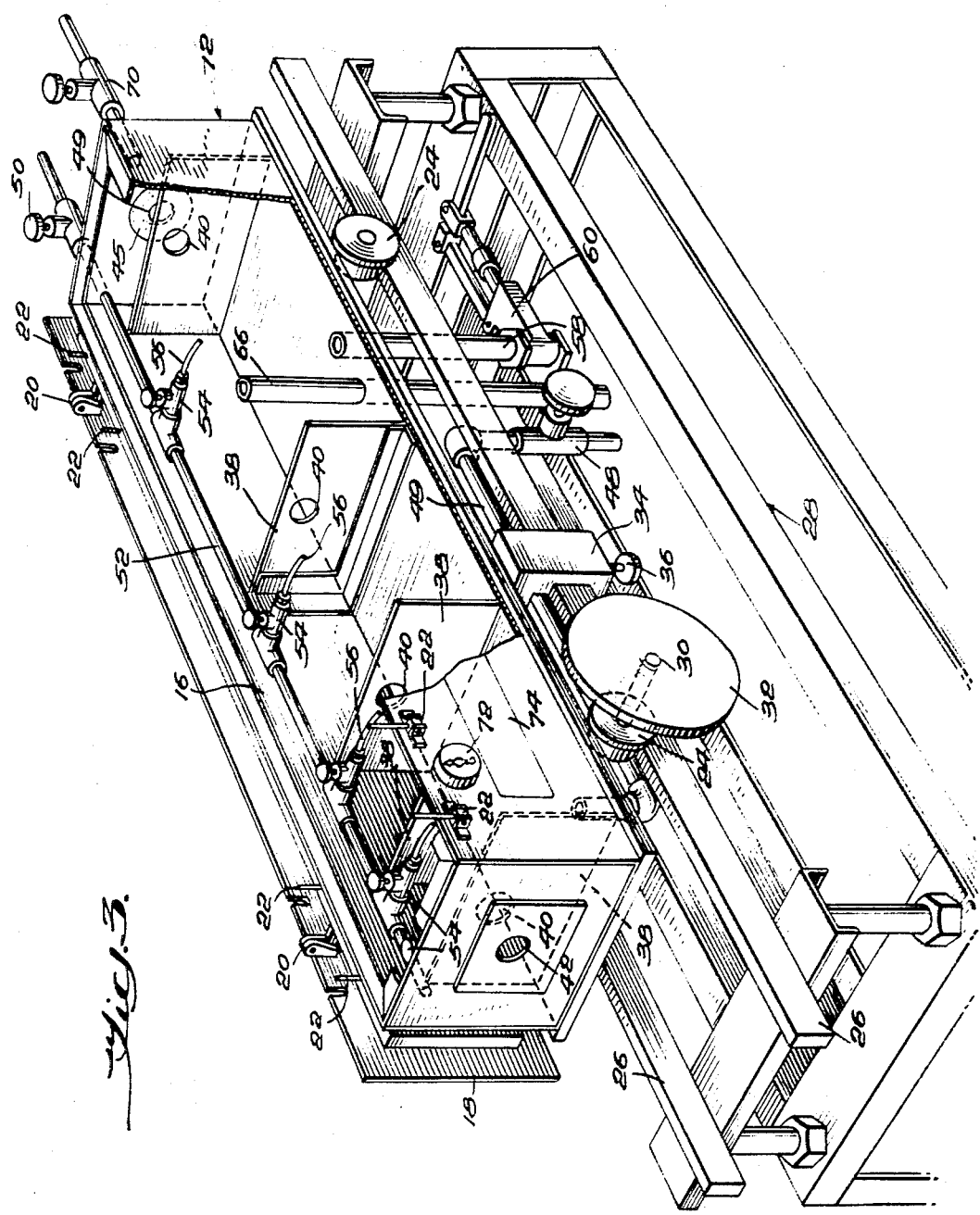

United States Patent Office 3,473,194
Patented Oct. 21, 1969

3,473,194
PLASTIC PIPE SIZING
John G. Farrow, Metuchen, N.J., assignor to Celanese Corporation, New York, N.Y., a corporation of Delaware
Filed Jan. 23, 1967, Ser. No. 610,888
Int. Cl. B29d 23/04; B29c 25/00
U.S. Cl. 18—14          5 Claims

ABSTRACT OF THE DISCLOSURE

A method and apparatus for sizing and cooling extruded plastic pipe or tubing in which the pipe is conducted directly from the extruder head through a sizing opening in a thin plate at the inlet end of a sizing box. The box is partially filled with water and a vacuum is established in the box to cause the pipe or tubing to expand, and thereby to contact the entire perimeter of the sizing opening. A plurality of thin plates in the box have openings which prevent the pipe from floating and to remove steam bubbles that may adhere to the surface of the pipe.

BACKGROUND OF THE INVENTION

This invention relates to forming plastic articles and more particularly to a method and apparatus for forming plastic tubing.

A conventional method of forming plastic tubing is to extrude melted plastic material through a die to form a continuous hollow tube. As the material flows out from the die face of the extruder, there is a tendency for the material to expand due to the release of pressure on the material. If the tubing is allowed to cool without any further restriction, the tubing is likely to have a rough surface, a non-circular cross section, and the size of the tubing cannot be accurately controlled. Various methods have been proposed to overcome this problem. Internal mandrel sizing, for example, is a very critical and costly method. The drawdown method in which the pipe passes through thin seizing plates produces pipe with severe melt orientation lines. These methods are not entirely satisfactory, therefore, either because of high cost of equipment or due to the poor quality of the pipe produced.

Another method that has been used for sizing extruded pipe is to pass the pipe through a sizing box. The conventional box has a sleeve through which the hot pipe passes. The box is filled with a coolant liquid and the pipe is sealed circumferentially against the interior of the sleeve by the axial tension applied to the pipe with pulling rollers and by internal pressure in the pipe. After it emerges from the sleeve, the pipe is submerged in the liquid where it cools and solidifies. There is a danger of lines being produced on the surface of the pipe due to capillary action of the coolant liquid between the sleeve and the pipe. Also, steam bubbles forming on the outer surface of the pipe cause "pits" which mark the outer surface of the pipe.

Accordingly, it is an object of this invention to provide an improved method and apparatus for sizing extruded tubing.

A further object of this invention is to provide a method and apparatus for sizing extruded tubing having a very glossy outer surface, without pits or lines in the tubing surface.

Another object of this invention is to provide a method and apparatus for extruding tubing that is accurately sized, and yet the equipment is inexpensive to construct and operate.

SUMMARY OF THE INVENTION

These objects are accomplished in accordance with a preferred embodiment of the invention by extruding tubing into a box that is filled with a liquid coolant, such as water. A vacuum is established in the box in order to stress the tubing circumferentially as it passes through a sizing opening in a thin plate at the end of the box. A series of thin plates in the box are spaced from the end plate and have aligned openings through which the tubing passes. The first thin plate of the end of the box provides maximum exposure of the tubing surface to the water in the tank, while restricting expansion of the tubing during cooling. The first plate also imposes a high local pressure on the molten outside surface of the pipe to form a very glossy surface. Since the end sizing plate is very thin, the high local pressure prevents the water in the box from flowing through the opening along the outer surface of the tubing, thereby avoiding the formation of lines on the tubing surface. The series of plates in the tank hold the tubing in a circular cross section, restrain the internal pressure, and wipe the steam bubbles off the outer surface of the pipe.

DESCRIPTION OF THE DRAWINGS

This preferred embodiment is illustrated in the accompanying drawings in which:

FIG. 1 is a side elevational view, partially schematic of the tubing sizing system of this invention;

FIG. 2 is a top plan view, partially in cross section of the extrusion die and the sizing box; and FIG. 3 is a perspective view, partially in cross section of the sizing box.

DESCRIPTION OF THE PREFERRED EMBODIMENT

Plastic tubing may be formed in accordance with this invention from thermoplastic materials, such as polyethylene. Preferably, polyethylene from which the tubing is made has a high molecular weight and a relatively high density in order to produce tubing of relatively high tensile strength. The material should be capable of extrusion without surging, excessive power requirements, or molecular weight breakdown. The finished tubing should have consistent quality, with a smooth, glossy outer surface, and without moisture tracks or melt fracture.

Plastic material is melted and conveyed by a conventional screw type extruder 2 to an extrusion head 4, as shown in FIG. 1. The head 4 is a conventional pipe or tubing head and includes a central pin 6 (FIG. 2), which is positioned at the center of the molten plastic flow passage 7. The pin 6 is rigidly held in position by a plurality of radial arms, or other suitable means. Thus, tubing 8 is extruded continuously from the die face 10. Preferably, the head 4 is designed to convey material at a sufficiently high velocity to prevent stagnation and degradation of the material, and also to promote good welding of the molten plastic after it has been separated by the arms that support the pin 6. The velocity of the plastic material, however, should be low enough so that flow orientation does not occur.

After passing out of the head 4, the tubing 8 enters a sizing box 12. At the opposite end of the box 12, a pair of puller rolls 14 apply an axial force to the tubing 8, to draw the tubing through the box. The sizing box, as shown in FIGS. 2 and 3, includes a fluid receptacle 16 which has a hinged lid 18. The lid 18 is mounted on hinges 20 along one side of the receptacle 16, and a plurality of screw clamps 22 are arranged at suitable intervals along the side of the receptacle 16 to secure the lid 18 in sealing relation across the top of the receptacle 16.

The receptacle 16 has a pair of flanged wheels 24 journaled for rotation on the bottom of the receptacle 16. The wheels 24 are supported on a pair of rails 26 which extend longitudinally of the receptacle 16. The rails 26 are secured in position on a suitable frame 28. The front axle 30 on which the wheels 24 are mounted has a hand wheel 32 secured at the outer end of the axle for adjusting the position of the receptacle 16 with respect to the rails 26. A clamp 34 which is secured to the bottom of the receptacle 16 engages under one of the rails 26 and a screw 36 in the clamp 34 may be tightened against the rail 26 to lock the receptacle at a desired location along the rails 26. The rails 26 are substantially aligned with the head 4, so that the spacing between the extrusion head 4 and the receptacle 16 may be adjusted, and the receptacle 16 may be easily moved away from the head for ready access to the die face 10.

A plurality of sizing plates 38 are mounted in the interior of the receptacle 16. Each of the sizing plates 38 is provided with a circular opening 40. The end walls of the receptacle 16 are also provided with openings 42 and 44, respectively, which are aligned with the holes 40 in the sizing plates 38. The end wall in which the opening 42 is formed, as well as the sizing plates 38 are preferably formed of metal, and are preferably between about 0.05 inch and one-eighth inch thick. The opening 44 is formed by a gasket 45 which seals against the outer surface of the tubing that is passing through the opening 44. The openings 40 in the sizing plates 38 are preferably slightly smaller than the opening in the preceding plate. In this manner, tubing that is extruded into the opening 42 at the die end of the receptacle 16 has its external diameter progressively reduced in passing through the sizing plates toward the puller end of the receptacle where it passes out through the opening 44. Since the extruded tubing is softer at the die end of the receptacle 16, the sizing plates 38 are more closely spaced at the die end than they are at the outlet end. Although the sizing plates 38 are shown in FIGS. 1 and 3 as extending to the bottom of the receptacle 16, the lower edges of the sizing plates are spaced preferably above the bottom of the receptacle in order to allow better circulation of coolant around the plates 38.

The fluid circulation and vacuum system is shown schematically in FIG. 1. A water pump 46 supplies water to the die end of the receptacle 16 through a regulating valve 48 and a conduit 49. The pump 46 also supplies water to a regulating valve 50 at the puller end of the receptacle 16. As shown in FIGS. 2 and 3, the valve 50 communicates with a conduit 52 that is mounted in the receptacle 16. A plurality of valves 54 are connected with the conduit 52 and positioned between the sizing plates 38. An outlet tube 56 on each valve 54 directs the water from the valve 54 into the region adjacent the extruded tubing 8 to cause agitation of the water that surrounds the tube and to improve heat transfer between the tubing and the water. A water drain pipe 58 in the bottom of the receptacle 16 permits the water to flow out of the receptacle when the valve 60 is opened. Normally, the valve 60 is closed and is opened when it is desired to dump the water out of the receptacle. The drain pipe 58 communicates with a reservoir 62, as shown in FIG. 1.

A vacuum pump 64 is connected with a vacuum pipe 66 which projects upwardly from the bottom of the receptacle, as shown in FIG. 3. The open end of the pipe 66 is preferably slightly higher than the top edge of the sizing plate 38 to ensure that the water entirely covers the tubing 8. The vacuum pipe 66 also serves as a water drain and water that is drawn into the pipe 66 is conducted back to the reservoir 62. Air is conducted to the interior of the tubing 8 by a conduit 68 that extends through the head 10. The interior of the tubing 8 is preferably at atmospheric pressure, while the interior of the box 12 is below atmospheric pressure. Thus, the tubing tends to expand as it passes through the box. The internal pressure in the receptacle 16, when the vacuum pump 64 is operating, may be controlled by a regulating valve 70 in the end wall of the receptacle. A vacuum gauge 72 may be provided on the side of the receptacle 16. Also, a window of transparent material 74 may be provided in the side of the receptacle adjacent the die end, in order to observe the sizing operation in the box 12.

In operation, the box 12 is positioned adjacent to the die face 10 and secured to the rails 26 by the clamp 34. Preferably, the die end of the box is spaced as much as 2 inches from the die face. The openings 40, 42 and 44 are axially aligned with the plastic flow passage 7. An initial section of pipe or tubing 8 is extruded and is threaded through the opening 42 in the end wall of the receptacle 16 and through the openings 40 in the sizing plate 38. The tubing 8 emerges from the box through the outlet opening 44, and passes between the drawing rolls 14, which apply an axial force to draw the extruded tubing through the box 12. When the extruded tubing emerges from the outlet end of the box, it hardened and therefore the rolls 14 do not mark or damage the tubing 8. When the initial tubing section 8 has been threaded through the box 12, the lid 18 is closed and clamped against the receptacle 16 by means of the screw clamps 22 to form a fluid tight seal between the lid and the receptacle. Water flows into the box through the conduit 52 and through the inlet pipe 49. The vacuum pump 64 draws a vacuum through the vacuum pipe 66, which also serves as an overflow drain for the water in the receptacle.

When the tubing is being extruded at a uniform rate, the tubing is soft when it reaches the first sizing opening 42 in the end wall of the box 12. The vacuum in the box causes the tubing to balloon outwardly. Since the end wall of the receptacle 16 is thin, the local pressure on the tubing as it passes through the opening 42 is high. After passing through the opening, the tubing is still hot enough to vaporize the water in the box and steam bubbles form on the surface of the tubing. The first plate 38 inside the box 12 wipes the bubbles off the surface of the tubing and restricts ballooning of the tubing while it is being sized and cooled. Preferably the tubing is fully hardened by the time it reaches the outlet opening 44. At high production rates, the tubing remains soft through a greater extent of its travel through the box 12, and the plates 38 are effective in restricting ballooning and removing steam bubbles from the tubing. The longitudinal speed of the tubing through the box may be as high as 70 feet per minute for one-half inch tubing.

Normally, the method and apparatus of this invention would be used for making pipe or tubing up to 2 inches in diameter; however, tubing of larger diameters could be produced. The vacuum in the box during extrusion is preferably between about 5 and 8 inches of mercury. As an example of actual conditions under which tubing was produced in accordance with this invention, tubing having a nominal size of two inches was extruded from a die having a diameter of 2.80 inches and a pin diameter of 2.50 inches. The opening 42 in the end wall of the receptacle was 2.505 inches in diameter. The first sizing plate 38 was spaced about 1 inch from the end wall and had an opening 40 with a diameter of 2.493 inches. The second plate 38 was spaced 2 inches from the first plate and the opening diameter was 2.481 inches. The third and fourth plates 38 were spaced 4 and 8 inches from the preceding plate and had openings of 2.470 inches and 2.458 inches, respectively. The tubing was produced at a rate of about 40 feet per minute, and had a glossy surface that was devoid of steam pits.

The use of a thin plate for the opening 42, rather than a thick spool, as is common practice permits the tubing to be cooled effectively by the water in the receptacle 16. A thin first plate also places a high local pressure on the soft outside surface of the tubing and produces a very glossy outside surface finish. Due to the high local pressure on the tubing the water in the tank is unable to pass out of the tank between the tubing and the periphery of the opening in the sizing plate and thus lines along the pipe due to capillary action of the water between the pipe opening and the pipe is eliminated. The sizing plates that are spaced along the length of the box 16 hold the pipe in a circular shape and restrain the internal pressure in the pipe. The plates also wipe off the steam bubbles that form on the outer surface of the pipe.

I claim:

1. In an apparatus for sizing plastic tubing as it is being extruded the improvement comprising: means forming a liquid receptacle, a plurality of thin plates having a thickness of between about 0.05 inch and one-eighth inch in said receptacle, said plates being substantially parallel and spaced apart, said plates each having an opening therein and said openings being in substantial alignment, and means for drawing a vacuum in said receptacle between said plates whereby tubing is accurately sized in passing through the plate openings while submerged in liquid coolant in the receptacle.

2. The apparatus according to claim 1 wherein said receptable has openings in opposite end walls, the opening in one of said end walls being aligned with saind plate openings, and being in the form of a thin plate.

3. The apparatus according to claim 1 wherein said plate openings are progressively smaller from said one end of the receptacle to the other.

4. The apparatus according to claim 2 including a pair of rolls adjacent the other of said end walls, whereby the tubing is pulled through said receptacle.

5. The apparatus according to claim 2 including means for circulating liquid coolant through said receptacle, said vacuum means including a pipe in said receptacle having an inlet above the level of said plate openings, whereby said inlet serves as a liquid overflow drain and an air extrusion conduit.

References Cited

UNITED STATES PATENTS

| | | | |
|---|---|---|---|
| 3,378,887 | 4/1968 | Reib et al. | 264—90 |
| 2,594,842 | 4/1952 | Bailey | 18—4 |

ROBERT F. WHITE, Primary Examiner

R. SHEAR, Assistant Examiner

U.S. Cl. X.R.

264—90